(12) United States Patent
Hudgins (10) Patent No.: US 11,591,242 B2
(45) Date of Patent: Feb. 28, 2023

(54) SYSTEM AND METHOD FOR ACCELERATED WASTE DECOMPOSITION IN AN UNSECURED LANDFILL

(71) Applicant: SUSTAINABLE SOLID WASTE STRATEGIES, LLC, Asheville, NC (US)

(72) Inventor: Mark P. Hudgins, Lynchburg, VA (US)

(73) Assignee: Sustainable Solid Waste Strategies, LLC, Asheville, NC (US)

( * ) Notice: Subject to any disclaimer, the term of this patent is extended or adjusted under 35 U.S.C. 154(b) by 169 days.

(21) Appl. No.: 17/071,551

(22) Filed: Oct. 15, 2020

(65) Prior Publication Data

US 2021/0107814 A1   Apr. 15, 2021

Related U.S. Application Data

(60) Provisional application No. 62/915,207, filed on Oct. 15, 2019.

(51) Int. Cl.
*B09C 1/10* (2006.01)
*C02F 1/58* (2023.01)
(Continued)

(52) U.S. Cl.
CPC ............ *C02F 1/58* (2013.01); *B09B 3/60* (2022.01); *B09B 3/80* (2022.01); *B09C 1/002* (2013.01);
(Continued)

(58) Field of Classification Search
CPC .... B09B 1/00; B09B 3/60; B09B 3/80; B09C 1/002; B09C 1/10; C02F 3/02; C02F 2103/06

USPC ........ 210/170.01, 170.07, 747.1, 747.7, 620, 210/901; 405/128.45, 128.7, 129.25, 405/129.95

See application file for complete search history.

(56) References Cited

U.S. PATENT DOCUMENTS 4,401,569 A * 8/1983 Jhaveri .................... B09C 1/10
                                                          210/170.07
4,584,102 A * 4/1986 Bogart ..................... C02F 3/12
                                                          405/129.25
(Continued)

FOREIGN PATENT DOCUMENTS

CN           103111451 A        5/2013

OTHER PUBLICATIONS

Schiopu, A.M., et al., (2010). Options for the treatment and management of municipal landfill leachate: common and specific issues. CLEAN-Soil, Air, Water, 38(12), pp. 1101-1110.
(Continued)

*Primary Examiner* — Christopher Upton
(74) *Attorney, Agent, or Firm* — Trevor T. Graves; Stites & Harbison PLLC (57) ABSTRACT

A system for decomposing a waste material in an unlined landfill including a landfill site having at least one waste disposal zone for receiving the waste material. The system also includes a remediation system configured for extracting a mixture of leachate and groundwater from groundwater within or adjacent to the landfill site and feeding the mixture into the at least one waste disposal zone along with air and other nutrients to enhance a rate of decay of the waste material within the at least one waste disposal zone.

19 Claims, 2 Drawing Sheets

(51) Int. Cl.
*B09B 3/60* (2022.01)
*B09C 1/00* (2006.01)
*B09B 3/80* (2022.01)
*C02F 3/02* (2023.01)
*C02F 103/06* (2006.01)

(52) U.S. Cl.
CPC ............. *B09C 1/10* (2013.01); *C02F 3/02* (2013.01); *C02F 2103/06* (2013.01)

(56) References Cited

U.S. PATENT DOCUMENTS

| | | | | |
|---|---|---|---|---|
| 4,755,304 | A * | 7/1988 | Hallberg | E03B 3/15 210/901 |
| 4,992,174 | A * | 2/1991 | Caplan | B09C 1/002 210/170.07 |
| 5,286,140 | A * | 2/1994 | Mather | B09C 1/10 405/128.7 |
| 5,525,008 | A * | 6/1996 | Wilson | B09C 1/002 405/128.5 |
| 5,605,417 | A | 2/1997 | Englert et al. | |
| 5,840,191 | A * | 11/1998 | Eccles | B09C 1/10 210/500.36 |
| 5,984,580 | A | 11/1999 | Ham et al. | |
| 6,024,513 | A | 2/2000 | Hudgins et al. | |
| 6,283,676 | B1 | 9/2001 | Hater et al. | |
| 6,364,572 | B1 | 4/2002 | Hudgins et al. | |
| 7,250,287 | B2 | 7/2007 | Aho | |
| 7,442,305 | B2 * | 10/2008 | Wu | B09C 1/10 405/129.25 |
| 8,313,921 | B2 | 11/2012 | Kraemer et al. | |
| 8,560,459 | B2 | 10/2013 | Bohlig et al. | |
| 8,865,453 | B2 | 10/2014 | Augenstein | |
| 10,071,403 | B2 | 9/2018 | Singh et al. | |
| 2005/0141966 | A1 * | 6/2005 | Greene | C12P 1/00 405/129.95 |
| 2015/0217347 | A1 | 8/2015 | Mullins | |
| 2019/0193129 | A1 * | 6/2019 | Yamazaki | B09C 1/10 |

OTHER PUBLICATIONS

Kadambala, R., et al., (2016) Evaluation of a buried vertical well leachate recirculation system for municipal solid waste landfills; Waste Management & Research, 34(12), pp. 1300-1306.
CN 103111451A—English machine translation, May 2018.
Revisions to the Criteria for Municipal Solid Waste Landfills To Address Advances in Liquids Management, A Proposed Rule by the Environmental Protection Agency on Dec. 26, 2018; (https://www.govinfo.gov/content/pkg/FR-2018-12-26/pdf/2018-27748.pdf).

* cited by examiner

SYSTEM AND METHOD FOR ACCELERATED WASTE DECOMPOSITION IN AN UNSECURED LANDFILL

RELATED APPLICATION

This application claims the benefit of U.S. Provisional Patent Application Ser. No. 62/915,207, filed on Oct. 15, 2019, the disclosure of which is incorporated herein by reference.

TECHNICAL FIELD

This disclosure relates generally to the accelerated bio-decomposition of waste material within a landfill or dumpsite and, more particularly, to supplying liquids and oxygen needed to effectively operate an aerobic landfill "bioreactor" system within an unlined landfill or dump to "stabilize" the waste faster or and/or improve the local soil and groundwater.

BACKGROUND

Waste management is a challenge faced by all communities globally regardless of their size, location or affluence. Most waste from urban populations throughout the world ends up in landfills. Although landfills or solid waste dumps are a better solution than having waste untreated and spread throughout the community, they still suffer from significant problems. For example, they are unsightly, odorous, and a breeding ground for disease and pests. Furthermore, rotting waste material also produces greenhouse gases such as methane, and toxic leachate that often pollutes surrounding groundwater.

To address these issues, modern landfills are designed with composite bottom liner systems made of plastic and compacted soils to help prevent the downward migration of leachate and other liquids into the groundwater. Moreover, these liner systems include a leachate collection/recovery system which captures the leachate that is produced by the waste. This leachate is pumped from the leachate collection/recovery system into holding tanks or ponds that are used as temporary leachate storage until they can be emptied into transport trucks and hauled away for off-site treatment or sent directly by discharge piping to offsite treatment plants.

While modern landfills provide a needed benefit, generate biogas for use as renewable energy and can store billions of tons of waste for years, there are many non-sustainable factors associated with them, including the long-term production and management of strong leachate, Greenhouse gases, and odors, costly PCC, and public opposition to new locations and/or construction. Moreover, agencies such as the U.S. Environmental Protection Agency (EPA) recognize that landfill liner systems provide no guarantees of protection to human health and the environment (HHE). Although leachate strength can reduce naturally over time, it is uncertain when the liner system might fail and thus release contaminants to the groundwater. Therefore, liner systems may only provide temporary protection to HHE.

Natural processes can decay many of the degradable solid wastes within a modern landfill. Referred to as "natural attenuation" (NA), the rate of this decay is slow, possibly lasting up to 100 years or more after the waste is buried. Under these anaerobic conditions (without air), chemical and biological processes produce high-strength compounds and contaminants, such as high BOD, volatile organic compounds, and persistent compounds such as Per- and Polyfluoroalkyl Substances (PFAS) which can become entrained in the leachate. Concentrations of these contaminants can remain above regulatory limits for years. If concentrations remain elevated and there is a consistent exposure or contact with the liner, the integrity of the liner could be compromised and possibly lead to a release to groundwater. Further, there are sites where the strength of the leachate and integrity of the liner systems is unknown due to poor record keeping.

To address these issues, both anaerobic and aerobic landfill bioreactors began to emerge in the 1990's wherein liquids were added to the waste, in part, to help increase organic waste decay. By adding liquids to waste (rather than allowing it to remain in a conventional "dry-tomb" setting), microorganisms in the waste were able to mineralize organic compounds faster and more effectively. While this approach is counter-current to existing EPA regulations, which still require cap landfills to keep liquids out of the waste mass, many of these projects were performed under research permits.

In addition to increased decay rates, adding liquids under anaerobic conditions to the landfill also increased the production of landfill gas. However, "aerobic" bioreactor landfills where air was added to the waste, increased the waste decay rate 20 to 30 times faster than under anaerobic conditions. This was significant. Instead of slow anaerobic decay, aerobic systems proved that landfills can sooner reach "functional stability" (FS)—the point at where the landfill reaches, either naturally or anthropogenically, a condition where future threats and risk from landfills are acceptable. With these data, landfill owners can best decide on whether to allow nature to slowly decay waste via NA or to use a bioreactor as a long-term leachate and landfill management strategy.

Today, models are being developed to assess the efforts needed to reach FS and in terms of their potential impact to leachate, groundwater, landfill gas, and cap settlement. For example, if FS is reached sooner using an aerobic system, perhaps in 20 more years versus 30, it may be possible for the owner to request relief of certain aspects of the post-closure care (PCC) requirement and lower the PCC duration to 20 years, for example. More importantly, should the liner become compromised, as described, the concentration of toxic contaminants will have been reduced (within 36 to 48 months) and thus there hypothetically would be a lesser risk. Last, if the risks are reduced sooner, site redevelopment or reuse could occur sooner as well.

To this end, reaching FS sooner before a liner might fail has become the focus of many of the US's 1,600-plus lined, operating landfill owners. As such, the number of bioreactor projects have grown, mostly operating within lined sites with leachate collection/recovery system systems. However, as the nation has over 50,000 unlined lined sites, many of which currently are or are threats to groundwater, the present system was developed not only to obtain the same benefits observed in aerobic landfills operated in lined landfills but, more important than producing landfill gas, the preferred embodiment of the present system is to reduce risk to HHE by achieving FS in an accelerated manner at unlined and/or leaking sites, especially where recovery of leachate is more difficult. Moreover, as lined sites may leak, an embodiment of the present system is appropriate for this subset category. In either case, performing aerobic landfill bioreactors using recovered groundwater mixed with leachate will not only help protect HHE priority sites, but also lower long-term risks and landfill post-closure care (PCC) efforts, and improve groundwater quality at hundreds of unlined sites.

As mentioned, many of the bioreactor projects performed in the US were permitted as research projects. Further, they were conducted primarily in lined landfills (RCRA Subtitle D). While there is no direct evidence, there are concerns that a bioreactor demonstration or operation which injected liquids into an unlined or leaking landfill would increase the potential to impact groundwater quality, due to flushing liquids into the surrounding soils and groundwater.

However, since the 1980's there have been numerous below-grade remediation projects conducted which use similar or the same configurations of wells, blowers, and pumps as aerobic bioreactors. They are used to remediate both impacted soils and groundwater, and in some cases, dozens of feet below the ground into both soils and groundwater, over large areas. Depending on their application, the remediation industry uses these "airsparging", "biosparging," or "bioventing" systems to inject and/or extract air, liquids, nutrients, and other compounds, and do so directly into soils and groundwater, either under anaerobic or aerobic conditions and without a protective liner. In these cases, such systems are designed to stimulate or augment, while in-situ, indigenous bacteria in degrading the toxic liquid- and vapor-phase chemicals and/or compounds that are present in both soils and groundwater. These compounds included a multitude of petroleum compounds, VOCs, BOD, COD, and some chlorinated compounds. Through treatment treated, more benign by-products remain.

As seen in many airsparging, biosparging and bioventing systems, various nutrients and oxidizers, including air, are used to mineralize or decay these compounds into less toxic forms, as does the present system. Therefore, bioreactors in unlined or leaking, lined landfills should be readily permitted for should groundwater be present either inside or outside the landfill boundary or occur within the unlined or leaking landfill, the present system will lower the concentrations in the waste, and thus in the leachate and groundwater, as observed and allowed in airsparging, biosparging and bioventing systems. Instead of a leachate collection system, the down-gradient wells will collect the impacted groundwater and reduce the potential for offsite contaminant migration as also observed and allowed for airsparging, biosparging and bioventing systems. Regarding the potential to increase risks or difficultly in managing the liquids, it should evident to those experienced in this art that the levels of contaminants present in the injected liquids will be no more toxic (since it treated) than what is already present in the groundwater. Therefore, using the bioreactor and down-gradient wells, no net increase in concentration or offsite migration of contaminants would be expected.

Also, large volumes of pharmaceuticals and their metabolites, mostly from human waste flushed down the toilet, are exiting municipal wastewater treatment plants intact and, by some estimates, contaminating almost 25% of the world's rivers and lakes. About 10,000 drugs are on the market in Western countries. Many have been detected in the environment in concentrations ranging from nanograms to micrograms per liter. All are biologically active by design; many are bioaccumulative and persistent. An embodiment of the system is also applicable in the management of these persistent compounds as well compounds such as Per- and Polyfluoroalkyl Substances (PFAS), which are found in many disposed Teflon and non-stick products. These compounds are recovered and treated ex-situ, if possible. An embodiment of the system is to re-inject these recovered compounds that have been mixed with groundwater as part of the bioreactor process. While biological treatment may not occur, as per organic compounds, these persistent compounds, pharmaceuticals and metabolites, are nevertheless contained or "sequestered," at the landfill instead of being sent offsite for disposal at municipal wastewater treatment plants where treatment might be ineffective and thus a future source of release to the environment. As each cycle of liquid injection is followed by recovery, another embodiment of the system is to conduct research on the effects of aerobic bioreactor on some of these persistent compounds.

In both developing and undeveloped nations, the legacy of past dumping practices remains largely un-addressed. In particular, the issue of groundwater contamination in areas surrounding landfill sites has been largely ignored or inadequately dealt with in the past. Such contamination of groundwater necessarily creates undesirable risks to human health and the local environment. Further, the need for workable landfill space is critical.

Some landfills (although contaminated) are located on properties having a potentially high intrinsic value, such as older industrial sites which are being encroached upon through rapid urbanization, provided the risk can be reduced. Thus, it may be desirable to reach FS sooner in order to leverage subsequent development into commercial or residential property. If the waste needs to be mined or excavated, the system will have removed such worker hazards beforehand. After mining, new landfills could be built and lined in the older, unlined excavations. Following the refilling of the cell with waste, the bioreactor system is applied again, yet over a liner. Such embodiments not only address urbanization opportunities and impacts to groundwater, but set the stage for sustainable landfilling (repeated use of the landfill cell and footprint)

It is an object of the present system to overcome or substantially ameliorate the deficiencies of the prior systems, or at least to provide a useful alternative. Specifically, a need exists to assist landfills in reaching "functional stability," i.e., the point at where the landfill waste is degraded, either naturally or anthropogenically, to a condition where future threats and risk from landfills, e.g. the presence of toxic compounds and contaminants, are acceptable; reach FS faster than natural, conventional systems do, and remediate local soils and groundwater.

SUMMARY

In accordance with one aspect of the disclosure, there is provided a system for decomposing waste material in an unlined landfill. The system includes a landfill site having at least one waste disposal zone for receiving the waste material. The system further includes a remediation system configured for extracting a mixture of leachate and groundwater from groundwater within or adjacent to the landfill site and feeding the mixture into the at least one waste disposal zone along with air and other nutrients to enhance a rate of decay of the waste material within the at least one waste disposal zone.

In one embodiment, the remediation system extracts the mixture from one or more positions located hydraulically down-gradient of the at least one waste disposal zone. In another embodiment, the landfill site has a site boundary extending about a periphery of the landfill site to define the area of the landfill site. In yet another embodiment, the landfill site has an operational zone arranged inwardly of the site boundary. In still yet another embodiment, the waste disposal zone is arranged within the operational zone.

In another embodiment, the landfill site may have two waste disposal zones. Each of the two waste disposal zones may be configured to operate independently of the other waste disposal zone. In another embodiment, the waste disposal zone is formed as an excavated region or pit within the landfill site. In yet another embodiment, a continuous sidewall may extend upwardly from a floor of the at least one waste disposal zone. The sidewall may be inclined such that the pit is narrower at the floor than at an upper end.

In yet another embodiment, the floor of the waste disposal zone is not lined with a plastic liner system. The floor may include a natural permeable soil, e.g. clay, to prevent downward migration of liquids such that liquids can be obtained through wells installed into the waste. In yet another embodiment, the floor of the waste disposal zone includes a porous, fractured, or permeable to allow liquids to migrate downwards into soils that are below the bottom of the landfill such that liquids can be obtained through wells installed into the waste as well as local soils. In still yet another embodiment, the floor of the waste disposal zone includes a porous, fractured, or permeable to allow liquids to migrate downwards into groundwater that is present below the bottom of the landfill such that liquids can be obtained through wells installed into the waste, local soils, and the groundwater, at locations surrounding the landfill including down-gradient.

In still yet another embodiment, a cover or capping is provided for covering the at least one waste disposal zone so as to contain, i.e., encapsulate or bury the waste material within the at least one waste disposal zone between a bottom and the cover. The cover or capping may be applied once the at least one waste disposal zone has been substantially filled to a maximum capacity for holding waste material.

In an additional embodiment, the remediation system may be entirely located within the landfill site, i.e., within the site boundary or the remediation system may be located within the operational zone. In another embodiment, a portion of the remediation system may be located, at least partially, outside the boundary of the landfill site. The remediation system may be configured to extract the mixture of leachate and groundwater from a position located outside the site boundary. The remediation system may be configured to extract the mixture of leachate and groundwater from a position located adjacent to the waste disposal zone. The remediation system may be configured to extract the mixture of leachate and groundwater from a position located beneath the waste disposal zone or landfill site. The remediation system may be configured to extract the mixture of leachate and groundwater from one or more positions located to one side (e.g. downstream) of the waste disposal zone. The remediation system may be configured to extract the mixture of leachate and groundwater from two or more spaced apart positions located around the waste disposal zone. The remediation system may be configured to extract the mixture of leachate and groundwater from evenly spaced apart positions.

In one embodiment, the remediation system includes one or more groundwater recovery wells, such as five or more constructed and located for extracting the mixture of leachate and groundwater from the ground beneath, adjacent to or otherwise surrounding the landfill site. The one or more groundwater recovery wells may be formed of corrosion resistant tubes, wells, or pipes, ideally having a circular or other shaped cross-sectional area. The groundwater recovery wells may have a diameter in the range of approximately 4 cm to approximately 10 cm, more preferably 4 cm to 6 cm. The groundwater recovery wells may have a diameter of approximately 5.2 cm.

In another embodiment, the remediation system may include one or more remediation pumps associated with the one or more groundwater recovery wells for transferring the mixture, via the associated one or more groundwater recovery well to a reservoir. The reservoir may be a storage tank or a pond located adjacent to the at least one waste disposal zone, i.e., indirect method. In yet another embodiment, a remediation pump may be associated with each of the one or more groundwater recovery wells or a single remediation pump may be associated with the one or more groundwater recovery wells. In still yet another embodiment, a first remediation pump may be associated with a first group of the one or more groundwater recovery wells and a second remediation pump is associated with a second group of the one or more groundwater recovery wells.

In yet another embodiment, an irrigation system is in fluid communication with the reservoir for drawing the mixture from the reservoir and reintroducing it into an enclosed area of the waste disposal zone, through a cover over the waste disposal zone. The irrigation system may be in the form of a nozzle, a duct, a drip device, and/or a liquid injection well. The irrigation system may include an irrigation pump for drawing the mixture from the reservoir and delivering liquids to the irrigation system. In yet another embodiment, the one or more remediation pumps associated with the one or more groundwater recovery wells may transfer the mixture directly to the at least one waste disposal zone, via the associated one or more groundwater recovery wells. The irrigation system may be in communication with an outlet of the one or more groundwater recovery wells for reintroducing a recovered mixture to the waste material, via the cover over the at least one waste disposal zone.

In still yet another embodiment, each of the one or more remediation pumps are arranged below the groundwater surface, i.e., pressurized or positioned above the groundwater surface, i.e., vacuum. The system may also include an air injection unit for introducing air into the at least one waste disposal zone such that the decomposition of a buried waste material occurs in an aerobic manner at a rate faster than under anaerobic conditions. The air injection unit may include at least one pipe or well extending through the cover and into an enclosed area between the cover and the floor of the at least one waste disposal zone. The at least one pipe or well may have an inlet connected to a source of air arranged above the cover and the one or more outlet openings arranged so as to sit within the enclosed area and through which air can be introduced to the enclosed area. The source of air may be a blower or compressor connected to the inlet opening of the at least one pipe or well. The one or more outlet openings may be arranged such that the at least one pipe or well introduces air over substantially an entire height of the enclosed area in which the waste material is buried.

In yet another embodiment, each of the at least one pipe or well may be arranged in a substantially vertical orientation so as to direct air generally, via the one or more outlet openings, in a direction extending inwardly from outer side edges of the at least one waste disposal zone. An air control means may be provided for monitoring and controlling an amount of air supplied to the waste material via the air injection unit. Additionally, a leachate control means may be provided for monitoring and controlling an amount of leachate and/or air supplied to the waste material via the groundwater collection system. The leachate control means may either alone or in combination with the air control means be adapted to control moisture levels within the enclosed area of the waste disposal zone such that, in use, these levels are maintained within nominal ranges.

In accordance with another aspect of the disclosure, a method of decomposing a waste material is provided. The method includes: providing a landfill site; defining at least one waste disposal zone within the landfill site for receiving the waste material; extracting a mixture of leachate and groundwater from the landfill site; feeding the mixture of leachate and groundwater into the waste material; and controlling the decay rate and increasing waste mass temperature due to aerobic exothermic reactions to minimize the reintroduction of leachate to groundwater.

In one embodiment, the landfill site is lined and leaking, while in another embodiment, the landfill site is unlined. In another embodiment, the mixture is extracted from one or more positions located hydraulically down-gradient of the at least one waste disposal zone. In yet another embodiment, the method includes the step of depositing the waste material into the waste disposal zone.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a system that represents both a practical and commercially significant improvement over prior art systems is hereinafter described.

Figure 1:
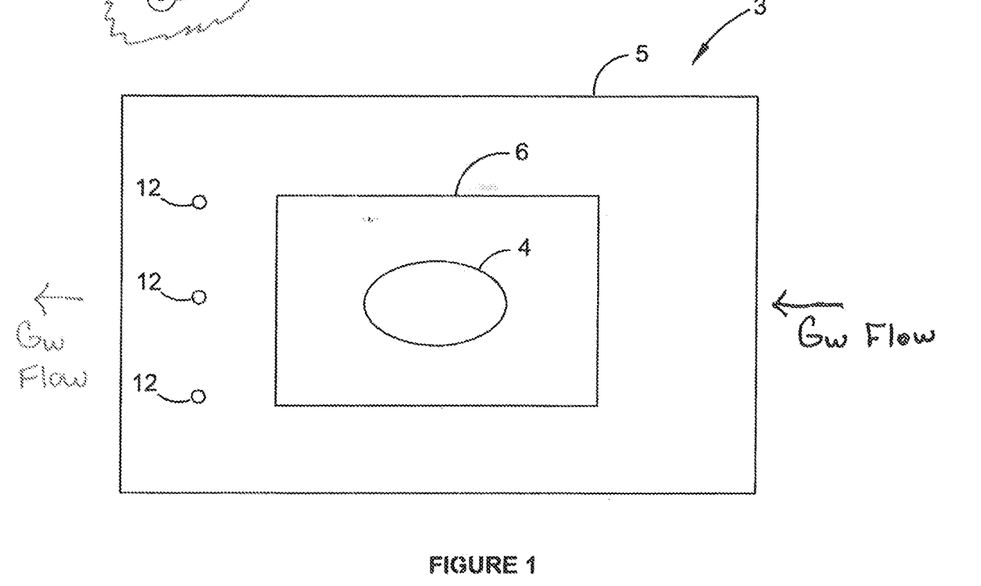
FIG. 1 shows a schematic plan view of the landfill site, operational zone and waste disposal zone forming one aspect of this disclosure.
Figure 2:
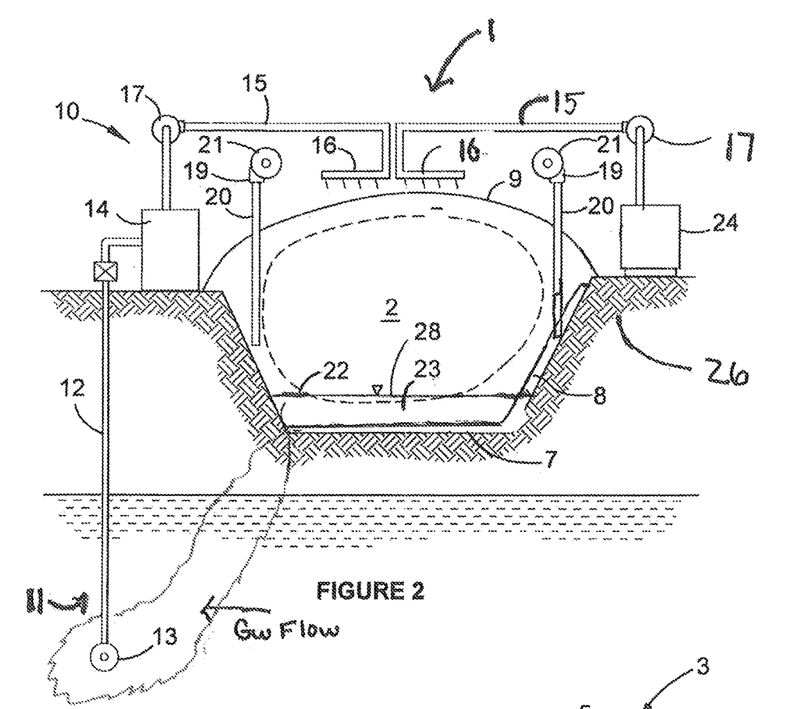
FIG. 2 is a schematic side view of an embodiment of a system for decomposing waste material forming one aspect of this disclosure.
Figure 3:
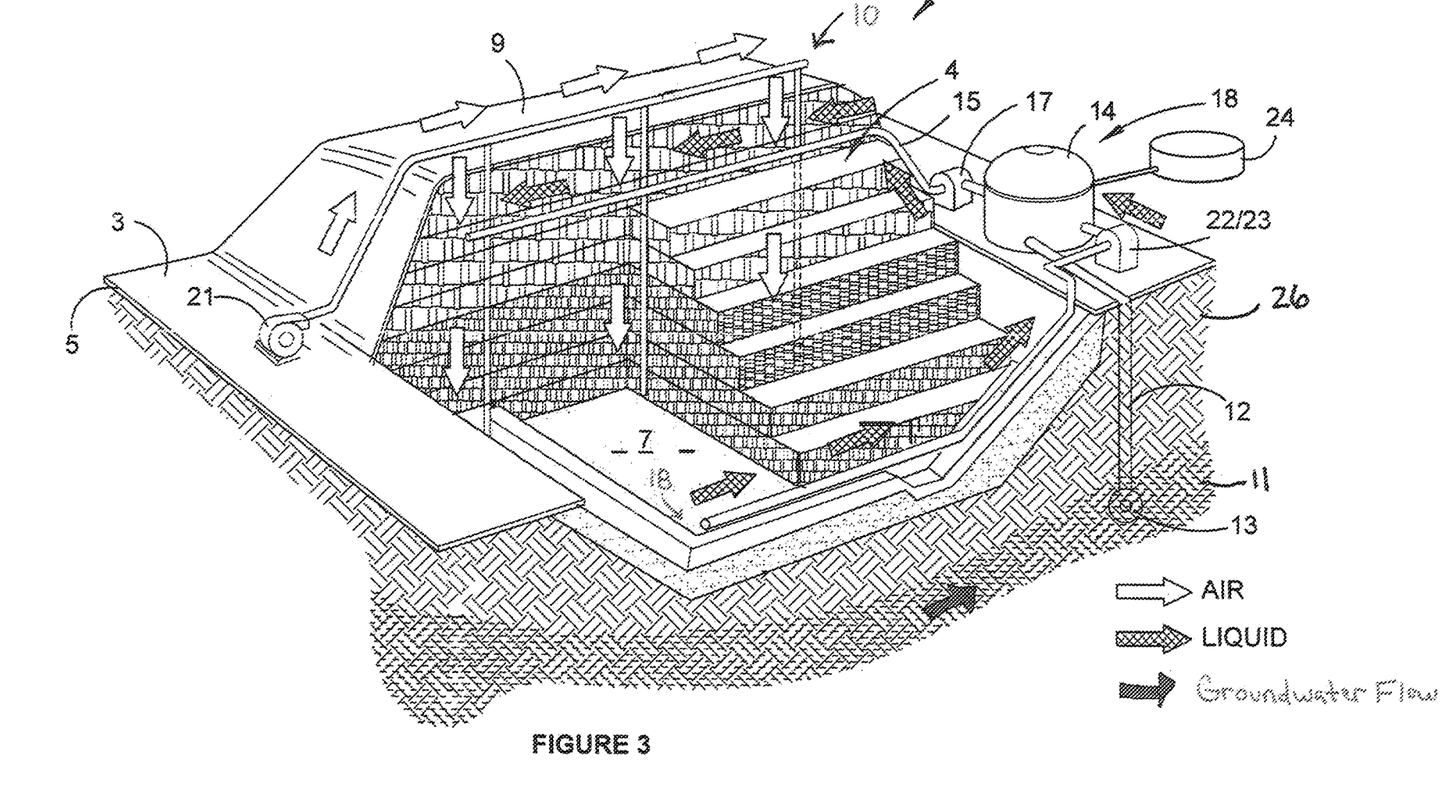
FIG. 3 shows a perspective section view of a system for decomposing waste material forming one aspect of this disclosure.

As shown in FIGS. 1-3, a system for decomposing waste material 2 is illustrated. The system does not necessarily cover prior systems whereby rapid decomposition of material is performed in lined landfills, but may be suitable for lined landfills whereby the liner has eroded or failed and therefore is leaking or will leak contaminants to the environment.

The system encompasses the recovery, collection, and mixing of on-site and off-site landfill leachate, gas condensate, wastewater, and/or groundwater followed by the direct injection of the combined liquids into the landfill body. Additionally, there is a simultaneous or sequenced mechanical injection of oxygen or air into landfilled waste, which converts the landfill into an aerobic bioreactor (with air) and thereby increases organic waste decay at a rate faster than under anaerobic (without air) conditions. Further, while the primary catalyst for the bioreactor is oxygen, other chemical, biological, and/or physical catalysts, nutrients, or amendments may be added as appropriate, either blended with the liquids or injected into the airstream to increase waste biodegradation rates.

Unlike previous systems, the system disclosed herein encompasses a method of recovery of the liquids that may be generated from the landfill unit during or after aerobic treatment and possibly subsequently released into the environment specifically by the use of groundwater recovery wells. It should be apparent by those skilled in the art of groundwater pumping that said recovery is performed by the installation and operation of groundwater recovery wells and pumps, located hydraulically down-gradient from the landfill unit to intercept the migrating contaminants.

It is known that aerobic landfill bioreactors generate heat within the waste as they operate. To ensure the biological process is maintained, liquids are added to the waste during the process and are either treated, consumed or evaporated. Any surplus of treated liquids which are not consumed and/or evaporated will likely migrate via gravity downward through the waste matrix and to the bottom of the landfill. In landfills with no protective liner, a portion of these liquids will migrate downward into sub-soils, and possibly groundwater, if present. In landfills which are constructed with liner systems yet are leaking, a similar condition occurs whereby these liquids will begin downward migration into sub-soils, and possibly groundwater, if present rather than collected by the landfill's leachate collection/recovery system.

This system has been developed primarily for use as a retrofittable system for existing landfill sites with no leachate collection/recovery system. However, it should be appreciated that the system is not limited to these specific applications and it can be readily adapted for use at existing sites which employ a leachate collection/recovery system and/or other means for collecting leachate, for sites with liners, or for sites where there is limited information of the presence or the condition of a liner or leachate collection/recovery system.

Advantageously, the system is multi-purpose in the following ways: (1) collects and provides the liquids needed for effective operation of the aerobic bioreactor that is installed within the waste above the unlined or compromised liner; (2) helps remediate local groundwater in the vicinity of the of the landfill which may contain toxic contaminants as extracting groundwater containing these contaminants reduces the potential for further migration offsite; and (3) reintroduces recovered liquids and groundwater containing treatable toxic contaminants which are not evaporated in the bioreactor yet are treated within the bioreactor. It should be noted that such reduction lower risks for should these liquids again migrate from the landfill and re-enter into the groundwater, they will have been treated. Furthermore, they would be recovered again for repeated treatment. Finally, the system serves as an alternative remediation approach for lined landfills or landfills with potentially compromised liners which are leaking contaminants to groundwater.

The system 1 includes a landfill site 3 having at least one waste disposal zone 4 for receiving the waste material 2. In the illustrated embodiment, the system 1 includes a single waste disposal zone 4. However, it will be readily appreciated by those skilled in the art that the system 1 could include two or more waste disposal zones which are either used concurrently or in a consecutive manner. The landfill site 3 has a site boundary 5 extending about the periphery of the landfill site 3 to define the area of the landfill site. An operational zone 6 is defined inwardly of the site boundary 5. The waste disposal zone 4 is arranged within the operational zone 6.

With reference to FIG. 2, the waste disposal zone 4 is in the form of an excavated pit within the landfill site 3. The waste disposal zone has a floor 7 and a continuous inclined sidewall 8 extending around and upwardly from the floor 7. The waste material 2 is deposited into the excavated pit 4 and may accumulate so as to form a pile of waste material 2 which extends above the upper open end of the pit (e.g. above the ground surface level).

To contain the pile of waste material 2 within the waste disposal zone, and specifically within the boundary of the pit 4, a cover (or capping) 9 is arranged over the upper open end of the excavated pit 4. The cover 9 covers the pile of waste material 2, effectively burying the waste material, such that the pile of waste material 2 is contained between the floor 7 of the pit 4 and the cover 9.

The leachate 28 in the mixture may have leaked, seeped or otherwise migrated through the floor of the waste disposal zone 4 and into the surrounding substrate 26 on which the landfill site is located. In certain embodiments, the mixture may contain indigenous bacteria and nutrients that promote more effective waste decay and organic mineralization once reintroduced to the waste material.

It has been found that by feeding the extracted mixture of leachate and groundwater into the waste disposal zone 4, so that the mixture and injected air acts on the waste material therein, there is a significant improvement in the rate of decay of the waste material within the waste disposal zone. In particular, the recycling of this mixture back into the landfill 2 along with air injection promotes aerobic decay and/or organic mineralization of the waste material and a consequential accelerated rate of decay. The accelerated rate of decay advantageously provides both environmental benefits to the surrounding communities as toxic contaminants are treated in-situ and commercial benefits to the operators of the landfill site as the need for separate groundwater remediation systems are precluded. Further, reductions in toxic contaminants can be used as part of a re-assessment of prescriptive landfill post-closure care (PCC) requirements which upon analysis may possibly lead to a reduction in PCC scope and costs.

The remediation system 10 provides further advantages by virtue of the fact that it may operate as a groundwater treatment system for extracting the polluting leachate from beneath the landfill site to improve or maintain an acceptable water quality for the surrounding area and communities. That is, the remediation system significantly reduces the amount of leachate passing from the landfill site into the groundwater 11 and then into neighboring streams, lakes, ponds, harbors, oceans or the like from which a town water supply may be obtained, whether directly or indirectly. Again, this advantageous feature provides both environmental and commercial benefits to surrounding communities and operators of the landfill site.

In certain embodiments, the remediation system 10 may act as the sole groundwater treatment system for a landfill site. In various other embodiments, the remediation system may operate in conjunction with a dedicated independent groundwater treatment facility (e.g. an existing groundwater water treatment facility). It will therefore be appreciated by those skilled in the art that the remediation system advantageously reduces the burden on an independent groundwater treatment facility.

The groundwater water/leachate mixture 11 arises from leachate 28 which has leaked, seeped or otherwise migrated through the floor 7 of the pit 4 and into the surrounding earth/environment 26 on which the landfill site 3 is located. It has been found that such undesirable seepage of leachate through the floor of a waste disposal pit 4 can occur regardless of whether or not the pit 4 has been lined with a liner (not shown). It has been recognized that, for those systems incorporating a liner, the liner can, over time, erode and fail. Upon failure of the liner, the leachate will start to seep through the floor 7 of the pit 4 and work its way into the groundwater of the surrounding environment 26 to produce the groundwater/leachate mixture 11. Otherwise, uncontaminated groundwater would be used.

A remediation system 10 is located within the site boundary 5 of the landfill site 3. The remediation system 10 is advantageously configured to extract at least some of the mixture 11 of leachate and groundwater from the landfill site 3 from one or more positions 12 located hydraulically down-gradient of the waste disposal pit 4.

As perhaps best shown in FIG. 1, the remediation system 10 is configured so as to extract the mixture 11 from one or more locations 12 outside the operational zone 6. As will be described in more detail below, the remediation system mixture 11 is fed back into the waste disposal zone 4 to promote accelerated decay of the waste material 2 following the extraction process.

Referring to FIGS. 2 and 3, the remediation system 10 includes three or more groundwater recovery wells 12 for extracting the mixture 11 of leachate and groundwater. It will be appreciated that the number of groundwater recovery wells is not limited to three, but may be any suitable number in any suitable configuration for extracting the mixture 11.

For example, in selecting the particular layout, configuration, size and number of groundwater recovery wells 12 to use in the particular remediation system 10, careful consideration should be given to parameters such as groundwater flow direction and speed, soil parameters, and the desired percentage of leachate to be recovered by the remediation well system 12.

The groundwater recovery wells 12 are preferably in the form of corrosion resistant pipes. The groundwater recovery wells 12 advantageously have a relatively small circular cross-sectional area with a diameter of approximately 5.2 cm.

Referring to FIGS. 2 and 3, the remediation system 10 includes a remediation well pump 13 associated with each groundwater recovery well 12. The remediation well pump 13 is in operative fluid communication with the groundwater recovery well pipes for drawing the liquid mixture 11 to a reservoir such as, for example, a storage tank 14. The storage tank 14 is located adjacent to or is otherwise in the vicinity of the covered waste disposal zone pit 4.

An irrigation system in the form of a liquid header unit 15 is in fluid communication with the storage tank 14 for drawing the liquid mixture 11 from the storage tank and reintroducing it into the enclosed area of the waste disposal zone 4. The irrigation system 15 includes a nozzle arrangement, ducting, injection well or drip device 16 configured to feed the mixture 11 through the cover 9 arranged over the waste disposal zone 4. As shown in FIG. 2, an irrigation pump 17 is operatively associated with the nozzle arrangement 16 for drawing the extracted mixture 11 from the storage tank 14.

In the illustrated embodiment, the storage tank 14 is configured to collect the groundwater/leachate mixture 11 through use of the remediation system 10. However, it will be readily appreciated by those skilled in the art that, in other advantageous embodiments, the storage tank 14 may be adapted to receive one or more supplementary liquids, such as other nearby tanks 24 or other sources.

The remediation system 10 is particularly advantageous in that it effectively operates as a groundwater treatment system by extracting the polluting leachate from the landfill site 3 to maintain an acceptable water quality for the surrounding area and neighboring communities. These mixtures 11 can be pumped to either tank 14 or 24.

Advantageously, the remediation system 10 may be configured to act as the sole groundwater treatment system for the landfill site. In other embodiments, the remediation system 1 may operate in conjunction with a dedicated independent groundwater treatment facility (not shown) and/or a separate leachate recovery systems or tanks 24.

In addition, it has been found that by reintroducing the extracted mixture 11 of leachate and groundwater (and supplementary liquids, if any) with oxygen back into the waste disposal zone 4 there is a significant improvement in the rate of decay of the waste material 2 within the waste disposal zone, reducing the period of time required to stabilize the site. As described in detail below, additional air may be provided to promote aerobic decay of the waste. Under aerobic conditions, the mixture 11 can contain indigenous respiring bacteria and beneficial nutrients which promote more effective waste decay and organic mineralization once reintroduced to the waste material. In some embodiments, the supplementary liquid may be one of: groundwater (extracted from the landfill site or a supplied from a separate source), leachate (extracted from the waste disposal zone or supplied from a separate source), groundwater/leachate mixture (optionally from a separate source or the original source which has been held in an independent storage system until required for use), other suitable supplementary liquids (e.g. water), or combinations of the above. The supplementary liquid may be fed into the piping of the existing irrigation system 15, or may be fed into the waste disposal zone via a separate independent supplementary liquid irrigation system.

As foreshadowed above, enhancement in the rate of decay of the waste material is provided by the use of an air injection unit 19 configured to introduce air into the covered (or enclosed) waste disposal pit 4 such that the decomposition of the buried waste material 2 occurs in an aerobic manner.

The air injection unit 19 includes a pipe 20 extending through the cover 9 and into the enclosed area between the cover 9 and the floor 7 of the waste disposal zone 4. The pipe 20 is connected to a source of air in the form of a blower 21 arranged above the cover 9. The pipe has one or more outlet openings (not shown) arranged so as to introduce air into the enclosed area. Each blower 21 is operatively connected to an air control means (not shown) for monitoring and controlling the amount of air supplied to the waste material via the air injection unit. The air control unit advantageously enables predetermined or desired remediation conditions to be achieved or maintained within the enclosed area of the waste disposal pit 4.

As shown in FIG. 3, a leachate collection/recovery system 18 arranged to collect leachate 28 which has accumulated within the enclosed area of the waste disposal zone 4. While the aerobic treatment in landfills with leachate collection/recovery system is covered in known, an embodiment of the present system would be that, in the event the liner or leachate collection/recovery system failed and releases contaminants to groundwater, the leachate collection/recovery system would be used to recover what leachate may be remaining 28 to provide liquids to the aerobic operation and to minimize further releases. In this context, the leachate collection/recovery system and liner systems are described.

The leachate collection system 18 includes a first leachate pump 22 and connected piping 23 in fluid communication with the accumulated leachate 28 to draw the leachate out of the pit 4 and into a leachate reservoir in the form of a leachate tank 14. The leachate collection system 18 also includes a leachate pump 17 connected to the piping 15 which leads to a leachate piping 16 or other suitable outlet device (e.g. nozzle) for directing the leachate to pass through the cover 9 and onto the buried waste material 2.

The piping of the leachate collection system 18 arranged along the floor 7 of the pit 4 may be configured to introduce air into the enclosed area of the waste disposal zone to assist in promoting aerobic decay of the waste material. For example, the piping may include perforations through which the air may be introduced into the waste disposal zone. In the embodiment of FIGS. 2 to 3, the leachate tank 24 of the leachate recovery system 18 is a separate independent reservoir to the storage tank 14 associated with the remediation system 10. However, it will be readily appreciated by those skilled in the art that in other advantageous embodiments, the remediation system 10 and the leachate recovery system 18 may be extracted and pumped to a single combined storage reservoir (e.g. pond) or tanks 14 and/or 24.

FIG. 3 shows an example wherein a single storage reservoir/tank 14 is used to store the mixture 11 extracted by the remediation system 10 and the leachate 28 recovered by the leachate recovery system 18 and mixed. In this embodiment, a supplementary tank 24 for holding supplementary liquids is connected for fluid communication with the storage reservoir. The supplementary fluids may be used to top up the storage tank to a predetermined minimum level in the event that the storage reservoir supplies run low. It will be appreciated by those skilled in the art that various other arrangements are possible. In particular, the specific location of equipment such as piping, pumps, storage tanks, etc. is not in any way limited to the particular arrangements illustrated in the drawings.

A leachate control means (not shown) is in operative communication with the leachate pumps (13, 17, 22) for monitoring (e.g. via sensors) and controlling the amount of leachate and/or air that is supplied to the waste material 2. The leachate control means, either alone or in combination with the air control means, may be adaptable to control moisture levels within the enclosed area of the waste disposal zone such that, in use, these levels are maintained within nominal ranges.

It will be appreciated that the system provides a safe, simple, convenient and efficient system and method for decomposing landfill waste material with the use of a mixture of leachate and groundwater. The mixture of leachate and groundwater is advantageously extracted from the groundwater surrounding a landfill site and fed back into the landfill site to improve the rate of decay of waste within the landfill. This greatly facilitates the decomposition process and leads to a significant number of benefits to the surrounding communities. For example, a significant reduction or near elimination of site odors, significant reductions (potentially close to 100%) in greenhouse gas production, waste-borne pathogens and toxic bacteria killed though natural heat produced during the process, and elimination of leachate pollution of groundwater systems. Moreover, site stabilization can potentially be reduced to a period of approximately three to four years compared to decades with existing systems. Benefits that flow from these include the fact that the stabilized site is available for landfill mining to extract composted organic material and recyclable material, or for reuse or development, leading to reduced community health costs, reduced vermin, insects and other pests, and/or increased value in adjacent real estate.

Advantageously, the system is readily adaptable and retrofittable to a wide variety of unlined landfill sites. The system can also be readily adapted for use with existing sites without a leachate recovery system. In various embodiments, the system can provide remediation for an entire site and the surrounding environment, including reducing pollution of the groundwater/water table from leachate seepage, percolation, and runoff, and may avoid the need for a separate independent groundwater remediation system. The system is particularly suitable for converting a landfill site in which the waste material is decomposed in an anaerobic manner such that the decomposition of the waste material occurs under an aerobic operation. In these and other respects, the system represents both a practical and commercially significant improvement over the prior art.

A critical factor in successfully permitting the present system for use in unlined landfills will be the results from previous bioreactor projects, their operational conditions and limitations, and any contingencies that needed to be addressed. Also, data from various airsparging, biosparging and bioventing projects which operate in soils and groundwater rather than waste will be reviewed as these permitted processes are conducted without a liner. Moreover, as the subject media is waste that is surrounded by soils and perhaps proximate to groundwater, factors such as hydrogeological conditions and geochemistry will play a large role in design and operations. Last, accurate models of operations and illustrations for protection to groundwater and/or HHE will most likely be required. As the landfill is stabilized sooner and, thus, will provide environmental benefits, the present system may be considered as the basis for becoming an industry "business disruptor" with respect to the current solid waste paradigm. Not only will many unlined landfills be addressed, but the reduction of risks will provide many additional environmental, economic, and social benefits, which, when combined together, may help reverse the current trends by society to move away from landfills.

For example, as unlined, leaking landfills produce toxic contaminants and enter the groundwater, the landfill owner is required to recover and treat impacted groundwater, typically referred to as a "pump and treat." (P&T) approach. As the landfill slowly generates leachate, the P&T system must wait and receive the leachate at this slow rate for lengthy operational periods, perhaps 20 years or more. This can translate into significant total costs. While effective at mitigating offsite migration of contaminants, this approach is an indirect method of treatment as it only addresses the "symptom." The present system is comparatively a more direct method as it addresses the source of the problem, i.e., the landfill. Where, P&T approaches are used, the present system will preclude their need, as appropriate.

As the system is aerobic, it also reduces foul odors, Greenhouse gases, and toxic leachate and, therefore, the need for separate odor and gas control systems may be minimized. While landfill gas-to-energy projects are operational at many large landfills, the present system can generate, at smaller sites which do not produce sufficient volumes of gas for an energy project, new carbon credit revenues. This is due to the avoided production of methane gas and the monetization of such emission reductions via voluntary carbon trading markets and meeting acceptable protocol standards. Also, reductions in leachate treatment costs can be realized via the evaporative effects of the system. Further, many persistent and recalcitrant compounds, such as PFAFs, can be sequestered within the waste due to leachate recovery and recirculation. Last, the system can lead to the subsequent redevelopment of the landfill much sooner than other approaches since risks will be lowered.

The system disclosed herein may also lead to business disruptions (both positive and negative) within other industries to include recycling, environmental remediation, energy, groundwater, odor control, wastewater, permitting, and compliance services. Over the long term, repeated use of the present system may reverse the course of current landfill management via market, environmental and socially driven schemes and create a new philosophy on how to better manage wastes worldwide.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

The invention claimed is:

1. A system for decomposing a waste material in an unlined landfill, comprising:
   a landfill site having at least one waste disposal zone for receiving the waste material; and
   a remediation system configured for extracting a mixture of leachate and groundwater from groundwater within or adjacent to the landfill site and feeding the mixture into the at least one waste disposal zone along with air and other nutrients to enhance a rate of decay of the waste material within the at least one waste disposal zone.

2. The system of claim 1, wherein the remediation system extracts the mixture from one or more positions located hydraulically down-gradient of the at least one waste disposal zone.

3. The system of claim 1, wherein the landfill site has a site boundary extending about a periphery of the landfill site to define an area of the landfill site.

4. The system of claim 1, wherein the at least one waste disposal zone includes two waste disposal zones.

5. The system of claim 1, wherein at least one waste disposal zone is formed as an excavated region or pit within the landfill site.

6. The system of claim 1, further including a cover or capping is for covering the at least one waste disposal zone so as to contain (e.g. encapsulate or bury) the waste material within the at least one waste disposal zone between a bottom and the cover.

7. The system of claim 1, wherein the remediation system is entirely located within the landfill site.

8. The system of claim 1, wherein the remediation system is configured to extract the mixture of leachate and groundwater from a position located adjacent to the at least one waste disposal zone.

9. The system of claim 1, wherein the remediation system is configured to extract the mixture of leachate and groundwater from a position located beneath the at least one waste disposal zone or landfill site.

10. The system of claim 1, wherein the remediation system is configured to extract the mixture of leachate and groundwater from one or more positions located to one side of the at least one waste disposal zone.

11. The system of claim 1, wherein the remediation system is configured to extract the mixture of leachate and groundwater from two or more spaced apart positions located around the at least one waste disposal zone.

12. The system of claim 1, wherein the remediation system is configured to extract the mixture of leachate and groundwater from evenly spaced apart positions.

13. The system of claim 1, wherein the remediation system includes one or more groundwater recovery wells constructed and located for extracting the mixture of leachate and groundwater from the ground beneath, adjacent to or otherwise surrounding the landfill site.

14. A system for decomposing a waste material in a landfill, comprising:
   a landfill site having (i) a site boundary, (ii) an operational zone defined inwardly of the site boundary, and (iii) at least one waste disposal zone arranged within the operational zone for receiving the waste material;
   a remediation system configured for extracting groundwater within or adjacent to the landfill site;
   a leachate collection/recovery system configured for collecting leachate accumulated within an enclosed area of the at least one waste disposal zone;
   a storage tank for receiving a mixture of groundwater and leachate;
   an irrigation unit in fluid communication with the storage tank for feeding the mixture into the at least one waste disposal zone to enhance a rate of decay of the waste material within the at least one waste disposal zone; and
   an air injection unit for introducing air into the at least one waste disposal zone such that decomposition of the waste material occurs in an aerobic manner at a rate faster than under anaerobic conditions.

15. The system of claim 14, wherein the air injection unit includes at least one pipe or well extending through a cover and into an enclosed area between the cover and a floor of the at least one waste disposal zone.

16. The system of claim 15, wherein the at least one pipe or well includes an inlet connected to a source of air arranged above the cover and one or more outlet openings arranged so as to sit within the enclosed area and through which air can be introduced to the enclosed area.

17. A method of decomposing a waste material, comprising:
   providing a landfill site;
   defining at least one waste disposal zone within the landfill site for receiving the waste material;
   extracting leachate and groundwater from the landfill site from one or more positions located hydraulically down-gradient of the at least one waste disposal zone;
   recovering additional leachate accumulated within an enclosed area of the at least one waste disposal zone;
   storing and mixing the leachate and groundwater and the additional leachate into a mixture;
   feeding the mixture into the at least one waste disposal zone; and
   controlling decay rate and increased waste mass temperature due to aerobic exothermic reactions to minimize the reintroduction of leachate to groundwater.

18. The method of claim 17, wherein landfill site is lined.

19. The method of claim 17, wherein the landfill site is unlined.

* * * * *